US011562312B1

(12) United States Patent
Fleming et al.

(10) Patent No.: US 11,562,312 B1
(45) Date of Patent: Jan. 24, 2023

(54) PRODUCTIVITY PLATFORM PROVIDING USER SPECIFIC FUNCTIONALITY

(71) Applicant: EMC IP Holding Company LLC, Hopkinton, MA (US)

(72) Inventors: Stephen Fleming, Cork (IE); John Paul N. Glick, Cedar Park, TX (US); Wissam F. Halabi, Northbridge, MA (US); Kenneth D. Stambaugh, Norfolk, MA (US); Cathal O'Mahony, Cork (IE); Chris Murphy, Douglas (IE); Marcelo L. Magrisso, Porto Alegre (BR); William Woodason, Norton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 257 days.

(21) Appl. No.: 15/897,438

(22) Filed: Feb. 15, 2018

(51) Int. Cl.
| | | |
|---|---|---|
| *G06Q 10/00* | (2012.01) | |
| *G06Q 10/06* | (2012.01) | |
| *G06F 8/60* | (2018.01) | |
| *G06F 11/34* | (2006.01) | |
| *G06F 11/30* | (2006.01) | |

(Continued)

(52) U.S. Cl.
CPC ........... *G06Q 10/0639* (2013.01); *G06F 8/60* (2013.01); *G06F 11/302* (2013.01); *G06F 11/3409* (2013.01); *G06N 20/00* (2019.01); *G06F 9/45541* (2013.01)

(58) Field of Classification Search
CPC combination set(s) only.
See application file for complete search history.

(56) References Cited

U.S. PATENT DOCUMENTS

| | | | | |
|---|---|---|---|---|
| 2005/0049973 | A1* | 3/2005 | Read | G06F 21/10 |
| | | | | 705/59 |
| 2005/0257209 | A1* | 11/2005 | Adams | H04M 1/72406 |
| | | | | 717/168 |

(Continued)

OTHER PUBLICATIONS

VMware Horizon 6 with View Performance and Best Practices Technical White Paper, 2015. Agrawal et al., pp. 1-25, (Year: 2015).*

(Continued)

*Primary Examiner* — Rutao Wu
*Assistant Examiner* — Scott M Ross
(74) *Attorney, Agent, or Firm* — Ryan, Mason & Lewis, LLP (57) ABSTRACT

An apparatus in one embodiment comprises at least one processing platform including a plurality of processing devices. The processing platform is configured to receive a request to deploy one or more applications of a plurality of selected applications, wherein the plurality of selected applications are selected based on a determined role of an individual within an enterprise, and to deploy the one or more applications for at least one user device responsive to the request. The processing platform is further configured to monitor execution of the one or more applications in connection with the at least one user device, to receive and analyze data corresponding to the execution of the one or more applications, and to automatically generate one or more recommendations in connection with the deployment of the one or more applications for the at least one user device based on the received and analyzed data.

20 Claims, 6 Drawing Sheets

(51) Int. Cl.
*G06N 20/00* (2019.01)
*G06F 9/455* (2018.01)

(56) References Cited

U.S. PATENT DOCUMENTS

| | | | | |
|---|---|---|---|---|
| 2008/0028470 | A1* | 1/2008 | Remington | G06F 21/33 |
| | | | | 726/25 |
| 2012/0129503 | A1* | 5/2012 | Lindeman | H04L 67/34 |
| | | | | 455/414.1 |
| 2014/0366016 | A1* | 12/2014 | Wang | G06F 8/61 |
| | | | | 717/178 |
| 2017/0139802 | A1* | 5/2017 | Hajiyev | G06F 11/3476 |
| 2017/0163650 | A1* | 6/2017 | Seigel | H04L 63/104 |
| 2017/0300846 | A1* | 10/2017 | Harwood | G06Q 10/063112 |
| 2018/0210808 | A1* | 7/2018 | Shanmugam | H04L 41/5067 |
| 2019/0155591 | A1* | 5/2019 | Kumar | G06F 11/34 |

OTHER PUBLICATIONS

VMware, Inc., "Enterprise Mobility Management, EMM, VMware AirWatch," https://www.air-watch.com, 2018, 2 pages.
VMware, Inc., "Horizon 7, Virtual Desktop Infrastructure, VDI," https://www.vmare.com/products/horizon.html, 2018, 10 pages.
Eracent, "License Harvesting," https://eracent.com/license-harvesting/, 2017, 3 pages.

* cited by examiner

PRODUCTIVITY PLATFORM PROVIDING USER SPECIFIC FUNCTIONALITY

FIELD

The field relates generally to information processing systems, and more particularly to a productivity platform providing role specific and customizable device and application bundles to increase productivity.

BACKGROUND

Depending on a user's role in an enterprise, the user will have different device and application needs from other users in the enterprise. For example, necessary equipment and software tools vary based on a user's function (e.g., sales, engineering, business executive, technical support) within an organization.

Accordingly, users can benefit from a device and application workstack that is tailored to their needs, addresses a total end user experience and deploys more than generalized technology solutions.

SUMMARY

Illustrative embodiments provide a productivity platform which deploys, manages, monitors and analyzes persona-specific hardware and application bundles. In accordance with an embodiment of the present invention, the bundles comprise compute devices, software, technology services and essential peripherals/accessories to enable productivity based on user role and work style. Embodiments of the present invention advantageously provide a productivity platform (e.g., a cloud-based productivity platform) that is configured to identify a technology package for a user based on a selected function or role within an enterprise, and deploy applications and services in the technology stack for a user over one or more communication networks. In accordance with an embodiment of the present invention, the productivity platform is advantageously configured to monitor and analyze device usage of equipment, applications and services in the technology stack to determine whether and how to modify the technology stack by adding, removing, activating and/or updating applications, equipment and/or services. In some embodiments, the productivity platform provides suggestions to users on how to modify the technology stack based on feedback received at the productivity platform through usage monitoring of equipment, applications and services in the technology stack.

In one embodiment, an apparatus comprises at least one processing platform including a plurality of processing devices. The processing platform is configured to receive a request to deploy one or more applications of a plurality of selected applications, wherein the plurality of selected applications are selected based on a determined role of an individual within an enterprise, and to deploy the one or more applications for at least one user device responsive to the request. The processing platform is further configured to monitor execution of the one or more applications in connection with the at least one user device, to receive and analyze data corresponding to the execution of the one or more applications, and to automatically generate one or more recommendations in connection with the deployment of the one or more applications for the at least one user device based on the received and analyzed data.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather are respectively controlled and managed by third-party cloud providers, are typically considered "public clouds." Examples of public clouds may include, but are not limited to, Amazon Web Services® (AWS), Google Compute Engine® (GCE), and Windows Azure® Services platforms. Thus, enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein a "data hub" refers to a database populated with data from a plurality of sources and from which data is taken to one or more destinations. Alternatively, a data hub has more than one source populating it, and/or more than one destination to which the data is moved.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment of the invention is implemented, other appropriate timescales that provide at least contemporaneous performance and output can be achieved.

Figure 1:
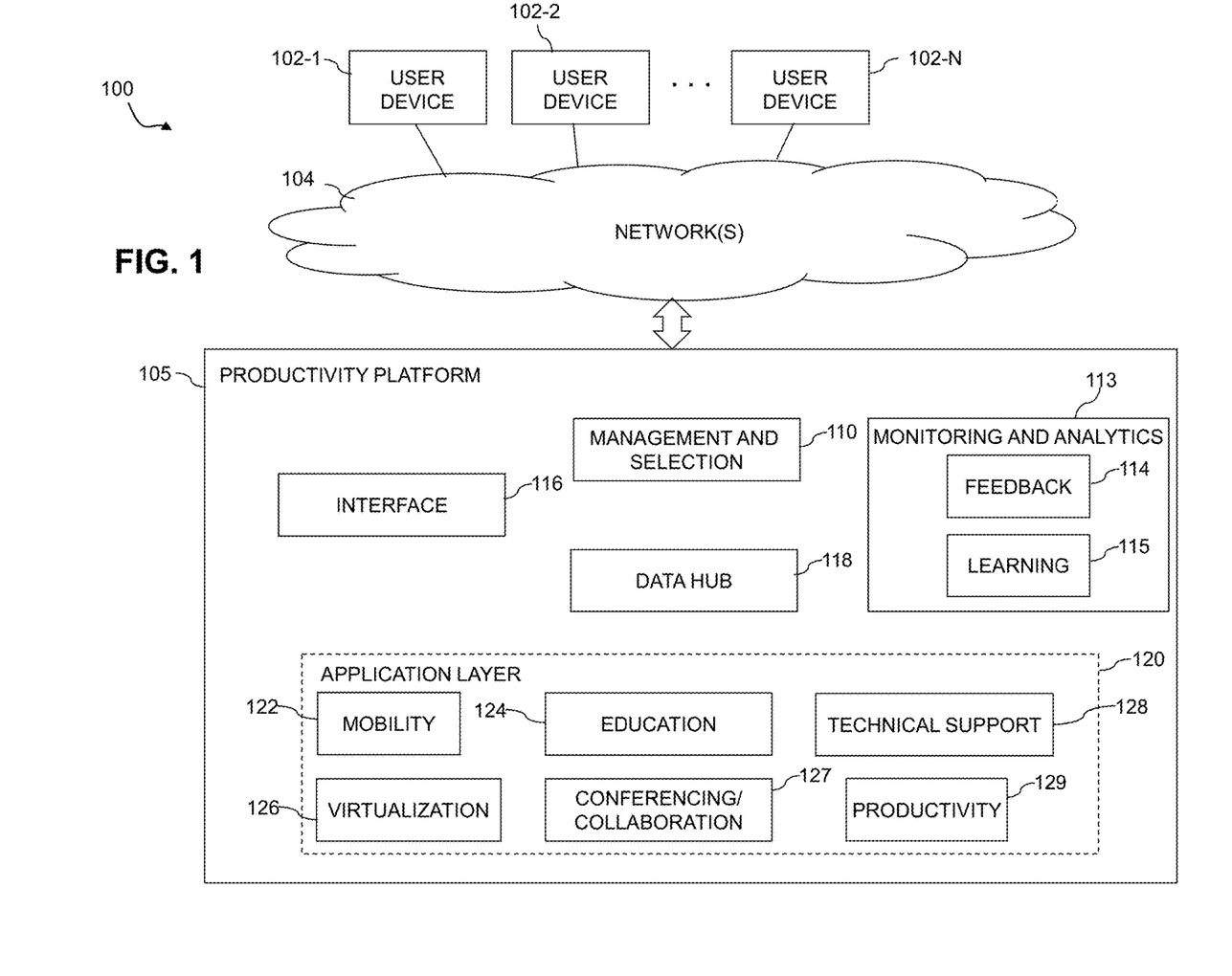
FIG. 1 is a block diagram of an information processing system comprising a productivity platform configured for deployment and management of user specific hardware and application bundles in an illustrative embodiment.

FIG. 1 shows an information processing system 100 configured in accordance with an illustrative embodiment. The information processing system 100 comprises user devices 102-1, 102-2, . . . 102-N. The user devices 102 communicate over a network 104 with a productivity platform 105.

The user devices 102 can comprise, for example, desktop, laptop or tablet computers, mobile telephones, or other types of processing devices capable of communicating with the productivity platform 105 over the network 104. The variable N and other similar index variables herein such as K, L and M are assumed to be arbitrary positive integers greater than or equal to two.

The term "user" herein is intended to be broadly construed so as to encompass numerous arrangements of human, hardware, software or firmware entities, as well as combinations of such entities. Productivity services are assumed to be provided for users under one or more productivity platforms, although it is to be appreciated that other types of infrastructure arrangements could be used. At least a portion of the available productivity services in some embodiments may be provided under Function-as-a-Service ("FaaS") and/or Platform-as-a-Service (PaaS) models, including cloud-based FaaS and PaaS environments.

The productivity platform 105 in the present embodiment is assumed to implement at least a portion of the technology stacks and corresponding functionality accessible to the user devices 102 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The productivity platform 105 deploys, manages, monitors and analyzes persona-specific hardware and application bundles on behalf of respective infrastructure tenants each corresponding to one or more users associated with respective ones of the user devices 102. As used herein, "deploy (s)," "deploying" or "deployment" refers to execution or partial execution of an application, or making an application available for downloading to a particular user device 102 so that the application can be executed or partially executed on the particular user device 102. As used herein, a "bundle" comprises a plurality of applications and at least one user device, and may comprise one or more accessory components, which are all grouped together based on a criteria (e.g., an individual's role/persona in an enterprise).

According to an embodiment, the infrastructure tenants are cloud infrastructure tenants. By way of example, the persona-specific hardware and application bundles are assumed to include, for example, enterprise mobility, educational, virtualization, conferencing, collaboration and technical support services and applications. In addition, the productivity platform 105 is configured to select an appropriate technology bundle based on a given persona/role within an enterprise, and monitor usage of the components of the bundle, and make determinations and/or recommendations regarding modifications to the deployed bundle. In some embodiments, the productivity platform 105 may rely on dynamic or real-time data concerning, for example, changes in an enterprise's core productivity tools, role definitions and/or changes in a user's position within an enterprise when selecting or recommending modifications to a technology bundle.

The productivity platform 105 in some embodiments may be implemented as part of cloud infrastructure in the form of a cloud-based system such as an AWS system. Other examples of cloud-based systems that can be used to provide at least portions of the productivity platform 105 and possibly other portions of system 100 include GCE and Windows Azure®.

The productivity platform 105 in the embodiment of FIG. 1 illustratively comprises a management and selection module 110, a monitoring and analytics module 113, an interface module, a data hub 118 and an application layer 120. The monitoring and analytics module 113 includes feedback and learning components 114 and 115, respectively. The application layer 120 includes mobility, education, virtualization, conferencing/collaboration, technical support and productivity components 122, 124, 126, 127, 128 and 129, respectively.

In more detail, the management and selection component 110 controls persona-specific application and hardware selection and delivery in connection with one or more user devices 102-1, 102-2, . . . 102-N. In accordance with an embodiment of the present invention, the management and selection component 110 receives as an input, a specific persona/role, such as, for example, "outside sales," "developer/engineer," "business professional," "remote support," "field support," and "presales," in connection with a user device 102. Based on the received input, the management and selection component 110 matches the appropriate technology bundle with the specific persona/role, and deploys one or more applications from the application layer 120 for the appropriate user device 102 (e.g., laptop, desktop, tablet, smartphone compute device) via one or more networks 104. As noted herein, the deployment can include execution or partial execution of the one or more applications. The management and selection component 110 can receive the persona input via, for example, an interface 116 of the productivity platform 105 configured for receiving persona/role information and corresponding user device 102 information. In accordance with an embodiment of the present invention, a user device 102 is identified as belonging to a user with a given persona/role, and is configured to communicate the given persona/role to the management and selection component 110 via interface 116 so that the user device 102 can pull (e.g., download), activate or update the applications and/or services from the productivity platform 105 that correspond to the given persona/role. Alternatively, the management and selection component 110 may receive the name or employee identification information in connection with a user device 102, and mine enterprise records via data hub 118 to obtain information regarding the persona/role of the employee to determine the appropriate technology package to deploy for a given employee's device.

In another embodiment, a given user device 102 being issued to particular enterprise personnel having a given persona/role is programmed with certain applications corresponding to that persona/role, and is configured to communicate with the productivity platform to execute and/or modify the applications as needed. Some applications of a technology bundle may be executed at least in part on the productivity platform 105, which can include, for example, virtual and/or cloud infrastructures and platforms.

The management and selection component 110 can be programmed to know which applications and/or services correspond to a given persona/role. For example, an "outside sales," persona may correspond to smaller, relatively portable devices, which include applications for syncing and sharing content, mobile conferencing and providing seamless connectivity. A "developer/engineer" persona may correspond to powerful self-supporting portable or desk-based devices running highly collaborative applications. A "business professional" persona may correspond to a medium performance laptop, with basic conferencing capabilities requiring average technical knowledge. A "remote support" persona may correspond to powerful self-supporting desk-based devices running highly collaborative applications and multiple versions of applications. A "field support" persona may correspond to powerful self-supporting portable laptop and smartphone devices having superior connectivity and mobile conferencing capabilities, and equipped with multiple versions of applications. A "presales," persona may correspond to smaller, relatively portable, but also powerful devices, which include applications for syncing and sharing content, mobile conferencing and provide seamless connectivity.

The monitoring and analytics module 113 monitors application and service usage on a user device 102. For example, a feedback component 114 of the monitoring and analytics module 113 receives automated feedback from a user device 102 via, for example, one or more network(s) 104, that applications and/or services from, for example, the application layer 120, are not being used, are rarely used (e.g., time of use does not reach or exceed a predetermined threshold), and/or are abandoned in the middle of a process or execution, on a user device 102. Alternatively, the feedback component 114 can receive direct feedback via, for example, one or more network(s) 104, from users of user devices 102 that the applications and/or services are not used, not useful and/or are difficult or cumbersome to use. According to an embodiment of the present invention, as a result of compiled feedback from a plurality of user devices 102 regarding unused, rarely used, or abandoned applications, the monitoring and analytics component 113, and more particularly, a learning component 115, automatically determines that the technology bundle for a given persona should be changed by modifying, removing or replacing the unused, rarely used, or abandoned applications with alternative applications. Alternatively, in connection with a single user device 102, the learning component 115 may modify, remove or replace the unused, rarely used, or abandoned applications with alternative applications, or recommend such changes to a user of the user device 102. In another embodiment, the feedback received by the feedback component 114 is provided to an administrator who makes changes to the programming specifying components of the application and hardware bundles.

According to an embodiment of the present invention, the learning component 115 uses a unique combination of machine learning algorithms to learn, based on feedback received by the feedback component 114, which applications and/or services are used or not used by certain personas/roles. In accordance with an embodiment of the present invention, the learning component 115 uses a combination of the frequency of use and direct user feedback data to determine optimal technology bundles for given personas/roles. These determinations are input to the management and selection component 110 to be used in connection with selection of appropriate bundles for different personas/roles. In general, machine learning techniques and components used in accordance with embodiments of the present invention may include, but are not necessarily limited to, a Support Vector Machine (SVM), a Multilayer Perceptron (MLP), a deep learning model, decision trees, clustering and a neural network.

In accordance with an embodiment of the present invention, the monitoring and analytics module 113 is also configured to automatically perform license harvesting in connection with unused and/or underutilized applications for which an enterprise may have purchased usage licenses. In connection with an embodiment of the present invention, based on application usage information received by the feedback component 114, software licenses that have been determined to be unused and/or rarely utilized can be automatically reclaimed and reassigned within an enterprise. Accordingly, software licenses already within an enterprise can be made available to other users without having to purchase additional licenses, thereby reducing software costs and maintenance. In some cases, where appropriate, licenses may also be retired.

The data hub 118 includes a database service, such as, but not necessarily limited to GCE Cloud Storage, Microsoft Azure Blob (Binary Large Object) Storage, DynamoDB, MongoDB, Amazon Aurora and Oracle database. The data hub 118 is populated with data from a plurality of sources. The data for the data hub 118 can be mined in real-time from multiple sources over the network(s) 104, so that the information processing system can react to changes in, for example, available products for the technology bundles, persona/role requirements and/or individual positions or functions within an enterprise.

Although the data hub 118 in the present embodiment is shown as part of the productivity platform 105, at least a portion of the data hub 118 in other embodiments may be implemented on one or more other processing platforms that are accessible to the productivity platform 105 over one or more networks.

In the FIG. 1 embodiment, the data hub 118 is assumed to comprise one or more storage systems configured to store information relating to processing performed and data used in the management and selection module 110, the monitoring and analytics module 113, the interface module 116 and the application layer 120, and relating to other functionality of the productivity platform 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Other particular types of storage products that can be used in implementing a given storage system of productivity platform 105 in an illustrative embodiment include VNX® and Symmetrix VMAX® storage arrays, flash hybrid storage products such as Unity™, software-defined storage products such as ScaleIO™ and ViPR®, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

As noted above, the application layer 120 includes mobility, education, virtualization, conferencing/collaboration, technical support and productivity components 122, 124, 126, 127, 128 and 129. In more detail, the mobility component 122 provides, for example, mobile device management (MDM) capabilities, so that users can configure devices (e.g., user devices 102) with bulk provisioning programs such as the Apple Device Enrollment Program (DEP), Knox Mobile Enrollment and Android zero-touch enrollment. The mobility component 122 also automatically executes applications for devices or automatically sends (e.g., pushes) applications to devices. The mobility component 122 also maintains applications in an enterprise application catalog for on-demand installation on user devices 102, and enables users to self-activate devices by, for example, entering their corporate credentials, and to connect to enterprise offerings, such as, but not necessarily limited to, email, virtual private networks (VPNs), Wi-Fi, content, intranet sites and other backend resources. In accordance with an embodiment of the present invention, the mobility component 122 automatically configures user devices 102 based on MDM policies for device restrictions, layout, settings, access, and notifications based on, for example, device operating system (OS) or device ownership type (e.g., BYO ("Bring Your Own") or enterprise owned).

The education component 124 provides educational services to users based on their persona/role. For example, more technical savvy personnel are provided with access to online/self-help type tools, while less technical savvy personnel are provided with applications for accessing educational programs, tutorials, presentations, and/or interactive educational courses where application and/or device functionality is taught to the participants.

The virtualization component 126 provides different levels of virtualization services to users via their user devices 102 based on their persona/role. For example, the virtualization component 126 supports different virtual workspaces to provide, for example, end users with access to all of their virtual desktops, applications, and online services through a single digital workspace, such as a single integrated virtual desktop infrastructure (VDI) platform. In accordance with an embodiment of the present invention, the virtualization component 126 transforms desktops into secure, digital workspaces that can be delivered on demand, provisions virtual or remote desktops and applications through a single VDI and application virtualization platform, consolidates control, delivery and protection of end user compute resources with policies that dynamically adapt to the end user's computing environment. The virtualization services are implemented at least in part utilizing virtual resources such as virtual machines (VMs) or Linux containers (LXCs), or combinations of both as in an arrangement in which Docker containers or other types of LXCs are configured to run on VMs.

The conferencing/collaboration component 127 includes applications which enable users to access, distribute and share files stored in enterprise content management systems, and to collaboratively edit and/or annotate shared files with built-in editing tools. The conferencing/collaboration component 127 also includes applications having enterprise chat and social collaboration tools allowing users to share ideas and collaborate across multiple devices, and contact applications allowing users to quickly search for colleagues, access rich contact information, view organizational charts, and place calls or send emails. For example, some applications automatically retrieve conference details from a calendar, and use the conference details to automatically connect a user device to a conference using available web addresses and/or phone numbers in the retrieved conference details.

The technical support component 128 includes applications for delivering technical support services by, for example, email, message boards, or live via support software, conferencing and/or remote access to devices. The technical support component 128 can also include applications for logging calls or incident reports and leveraging plug-ins to support daily workflows and enable mobile productivity via an integrated platform. As used herein, a "plug-in" or "add-on" refers to a software component that adds new features to an existing computer program.

The productivity component 129 includes, for example, specialized applications for email, calendars and contacts, for accessing content repositories, intranet sites and web and cloud applications, and for data protection, including deployment of control points at the user, device, application and/or network levels.

It is assumed that the productivity platform 105 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as VMs or LXCs, or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the management and selection module 110, the monitoring and analytics module 113, the interface module 116, the data hub 118, the application layer 120 and the elements thereof can each be implemented in the form of one or more LXCs running on one or more VMs. Other arrangements of one or more processing devices of a processing platform can be used to implement the management and selection module 110, the monitoring and analytics module 113, the interface module 116, the data hub 118 and the application layer 120 as well as other components of the productivity platform 105. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the productivity platform 105 to reside in different data centers. Numerous other distributed implementations of the productivity platform 105 are possible.

Accordingly, one or each of the management and selection module 110, the monitoring and analytics module 113, the interface module 116, the data hub 118 and the application layer 120 can each be implemented in a distributed manner so as to comprise a plurality of distributed components implemented on respective ones of the plurality of compute nodes of the productivity platform 105.

Although illustratively shown as being implemented within the productivity platform 105, the management and selection module 110, the monitoring and analytics module 113, the interface module 116, the data hub 118, the application layer 120 and the elements thereof in other embodiments can be implemented at least in part externally to the productivity platform 105. For example, such components can each be implemented at least in part within another system element or at least in part utilizing one or more stand-alone components coupled to the network 104.

It is to be appreciated that these and other features of illustrative embodiments are presented by way of example only, and should not be construed as limiting in any way.

Accordingly, different numbers, types and arrangements of system components such as the management and selection module 110, the monitoring and analytics module 113, the interface module 116, the data hub 118, the application layer 120 and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments functionality for the productivity platform 105 can be offered to cloud infrastructure customers or other users as part of FaaS and/or PaaS offerings.

Figure 2:
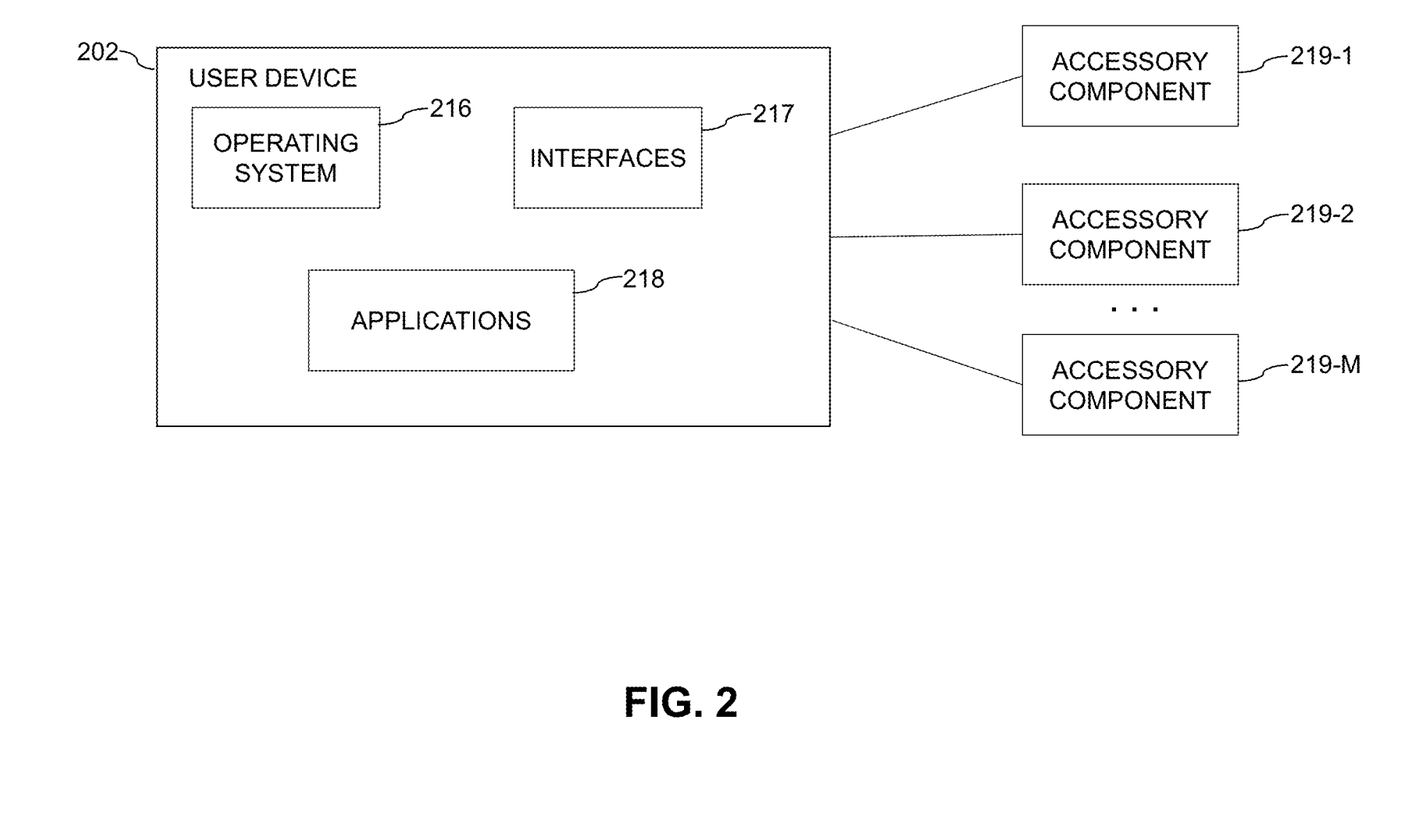
FIG. 2 is a block diagram of a user device comprising a user specific hardware and application bundle in an illustrative embodiment.

FIG. 2 is a block diagram of a user device comprising a user specific hardware and application bundle in an illustrative embodiment. Referring to FIG. 2, a user device 202 for a given persona/role, such as, for example, a desktop, laptop or tablet computer, mobile telephone, or other types of processing device capable of communicating with the productivity platform 105 over the network 104, comprises an operating system 216, one or more user interfaces 217 and applications 218 received from, for example the applications layer 120 or pre-loaded onto the user device 202. One or more accessory components 219-1, 219-2, . . . 219-M such as, for example, wired or wireless headsets, noise canceling headsets, microphones, styluses, monitors, touchscreen monitors and webcams, can be operatively coupled to and/or integrated into the device 202. In accordance with an embodiment of the present invention, the operating system 216 is configured to run and support the required applications and accessory components 219. Non-limiting examples of operating systems 216 include Windows® 10, Unix® and Linux®. The user device 202 includes one or more user interfaces 217 such as, but not necessarily limited to, a conversational interface, a graphical user interface (GUI), a touchscreen interface, a natural language interface, and a voice interface.

The applications 218 can include applications supporting any of the functionality described herein in connection with the applications layer 120, such as, but not limited to, applications for sharing, syncing and backing up content across multiple devices, audio, video and web conferencing, virtualization, collaborative workspaces, mobility, productivity, education, technical support and/or for supporting accessory components, such as a stylus with digital ink.

Figure 3:
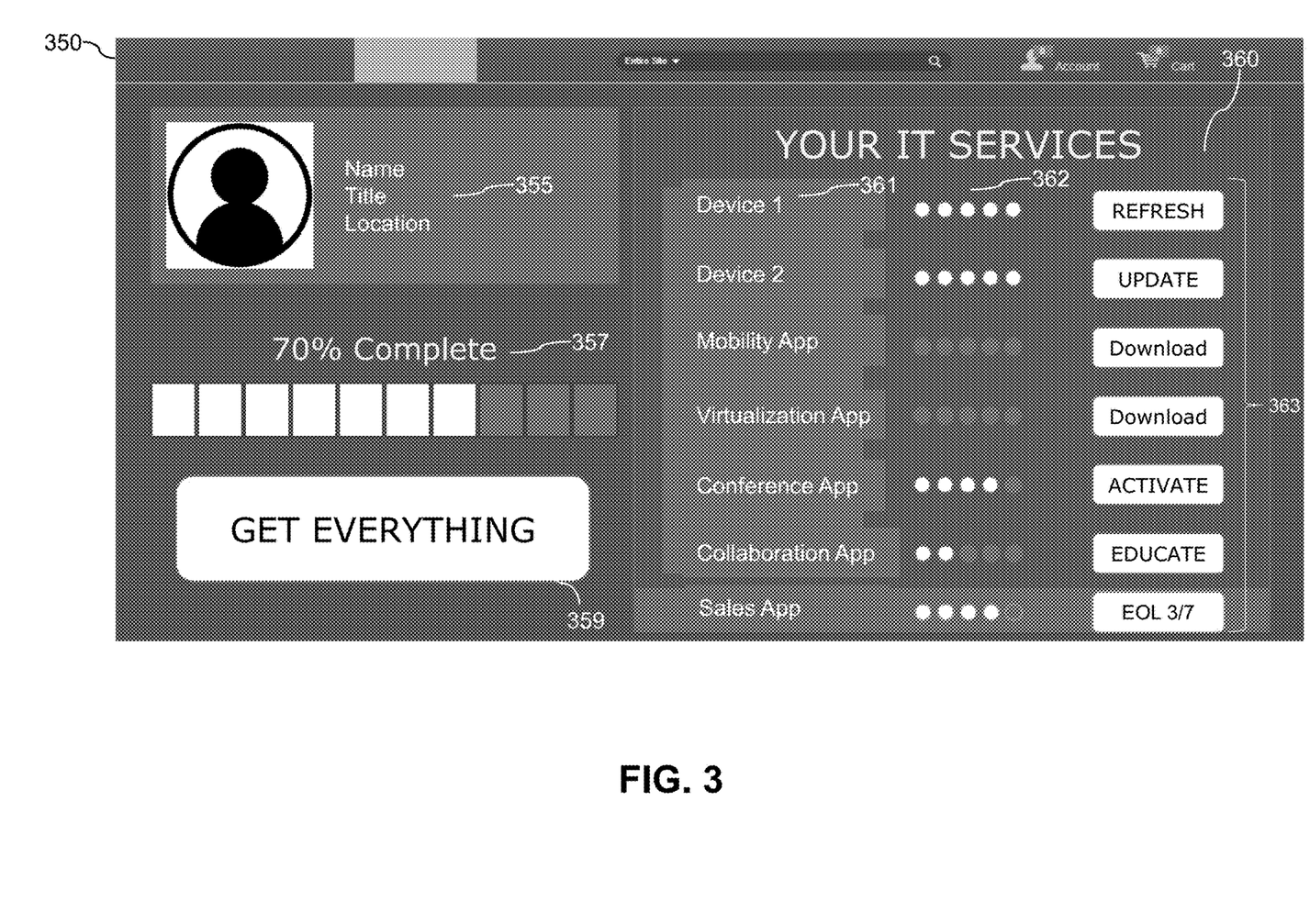
FIG. 3 illustrates an interface for providing suggestions to a user on how to modify a user specific hardware and application bundle in an illustrative embodiment.

FIG. 3 illustrates an interface for providing suggestions to a user on how to modify a user specific hardware and application bundle in an illustrative embodiment. In connection with the monitoring and analytics component 113 described herein, the productivity platform 105 may transmit recommendations regarding modifications to or actions to take in connection with a deployed technology bundle to a user device 102/202. The recommendations can be based on usage monitoring including feedback from a plurality of user devices or a particular user device regarding unused, rarely used, abandoned or problematic applications, and or enterprise decisions regarding changes to and/or replacement of core productivity applications or other tools.

As shown in FIG. 3, an interface 350, which may be seen on a screen of a user device 102/202, is customized to display technology bundle information 360 for a particular user, and includes user information 355, such as name, title and location. The technology bundle information 360 includes a bundle component listing 361 of the user's devices (e.g., Device 1, Device 2), and applications which are part of the user's bundle (e.g., mobility, virtualization, conferencing, collaboration and sales). The interface 350 includes graphical indicators 362 showing relative levels of usage of the bundle components, as well as clickable icons 363 including different suggested actions a user may take in connection with each of the bundle components. A "clickable icon" refers to an interface item which can be activated by, for example, selecting that item with, for example, a mouse, pointer, stylus, finger on a mobile device, or other means. The suggested actions can be based on feedback sent from a user device 102/202 to the monitoring and analytics component 113 corresponding to, for example, application and device versions, installations, usage, and/or problems with execution. For example, suggested actions may include, but are not necessarily limited to, refreshing or updating a particular device/operating system or application, downloading or activating an application, and obtaining training/education in connection with an application. Clickable icons 363 may also indicate that an application may no longer be available after a certain point, indicating an end-of-life (EOL) for that particular application and the date when the application is planned to go out of service for the enterprise. When selected, the clickable icons 363 may perform the labeled actions or, for example, in the case of an EOL notification, direct a user to alternative applications which may be downloaded to replace the application going out of service. The interface 350 further includes an indicator and percentage information 357 concerning a level of completeness of a user's technology bundle based, for example, on missing, not activated or outdated applications. The interface 350 further includes a catch-all icon 359 where a user can perform a single click operation to accept each of the recommended actions in the clickable icons 363.

The operation of the information processing system 100 will now be described in further detail with reference to the flow diagram of FIG. 4. The process as shown includes steps 401 through 409, and is suitable for use in the system 100 but is more generally applicable to other types of information processing systems comprising productivity services platforms configured to deploy, manage, monitor and analyze persona-specific hardware and application bundles.

In step 401, a request is received, for example, at the productivity platform 105, to deploy one or more applications (e.g., applications from the application layer 120) of a plurality of selected applications (e.g., an application bundle), wherein the plurality of selected applications are selected based on a determined role of an individual within an enterprise. In accordance with an embodiment of the present invention, the productivity platform 105 receives the determined role of the individual within the enterprise as an input, and matches the plurality of selected applications with the received input. In more detail, the management and selection component 110 is able to match the appropriate technology bundle with the specified persona/role.

In step 403, the one or more applications are deployed for at least one user device (user devices 102/202) responsive to the request. At steps 405 and 407, the execution of the one or more applications is monitored (e.g., by the monitoring and analytics component 113) in connection with the at least one user device, and data corresponding to the execution of the one or more applications is received and analyzed (e.g., by the monitoring and analytics component 113).

Referring to step 409, one or more recommendations are automatically generated in connection with the deployment of the one or more applications for the at least one user device based on the received and analyzed data. The one or more recommendations may comprise a recommendation to modify, replace or remove the one or more applications, and can be based on one or more machine learning algorithms. The received and analyzed data can comprise automated usage data, and the productivity platform 105 may be configured to automatically perform license harvesting based on the automated usage data. The received and analyzed data can also comprise direct feedback from a user of the at least one user device.

In accordance with an embodiment of the present invention, the selection of the plurality of selected applications (e.g., application bundle) is further based on at least one of dynamic and real-time data, can be based on a change in application offerings of the enterprise, a change to one or more defined roles in the enterprise and/or a change to the determined role of the individual within the enterprise.

In accordance with embodiments of the present invention, the one or more applications activate the at least one user device, automatically configure the at least one user device based on one or more mobility device management policies, provide one or more virtualization services, provide one or more conferencing services, and/or provide one or more workspace collaboration services.

Figure 4:
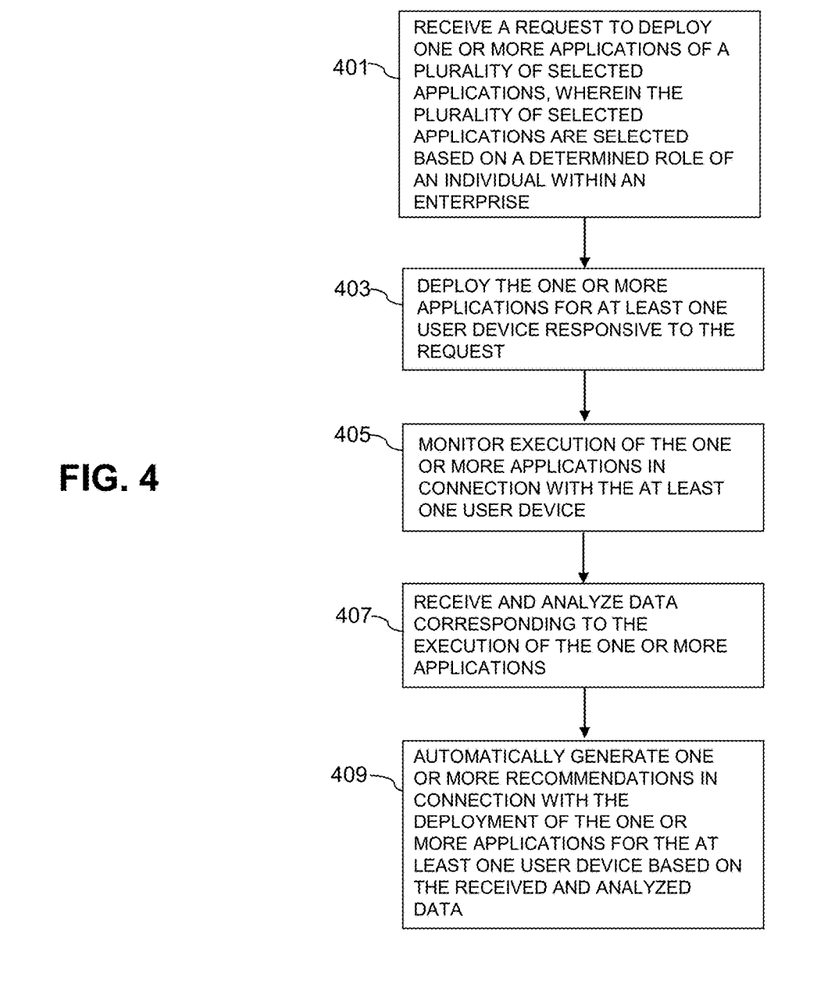
FIG. 4 is a flow diagram of a process utilizing a productivity platform to deploy and manage user specific hardware and application bundles in an illustrative embodiment.

It is to be appreciated that the FIG. 4 process and other features and functionality described above can be adapted for use with other types of information systems configured to deploy, manage, monitor and analyze persona-specific hardware and application bundles on a productivity platform or other type of processing platform.

The particular processing operations and other system functionality described in conjunction with the flow diagram of FIG. 4 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a productivity platform as disclosed herein can provide a number of significant advantages relative to conventional arrangements. For example, the productivity platform in accordance with embodiments of the present invention advantageously provides tailored workstacks to users based on specified persona/role, thereby eliminating wasteful applications on user devices and making more efficient use of computing and memory resources. Embodiments of the present invention advantageously monitor usage of applications on user devices, and provide mechanisms for modifying technology bundles based on feedback in connection with execution of applications in an application bundle (or a lack thereof).

Embodiments of the present invention further analyze dynamic and real-time data in connection with, for example, enterprise offerings, and updates to role definitions and personnel positions in order to provide users with the most up to date application packages for their persona/role. Embodiments of the present invention advantageously provide users with recommendations regarding the components included a technology bundle, and the means to quickly and efficiently act on the recommendations using one or more icons tied to modification task.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as the productivity platform 105 or portions thereof are illustratively implemented for use by tenants of such a multi-tenant environment.

As mentioned previously, cloud infrastructure as disclosed herein can include cloud-based systems such as AWS, GCE and Windows Azure. Virtual machines provided in such systems can be used to implement at least portions of one or more of a computer system and a content addressable storage system in illustrative embodiments. These and other cloud-based systems in illustrative embodiments can include object stores such as AWS S3, GCE Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing productivity of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
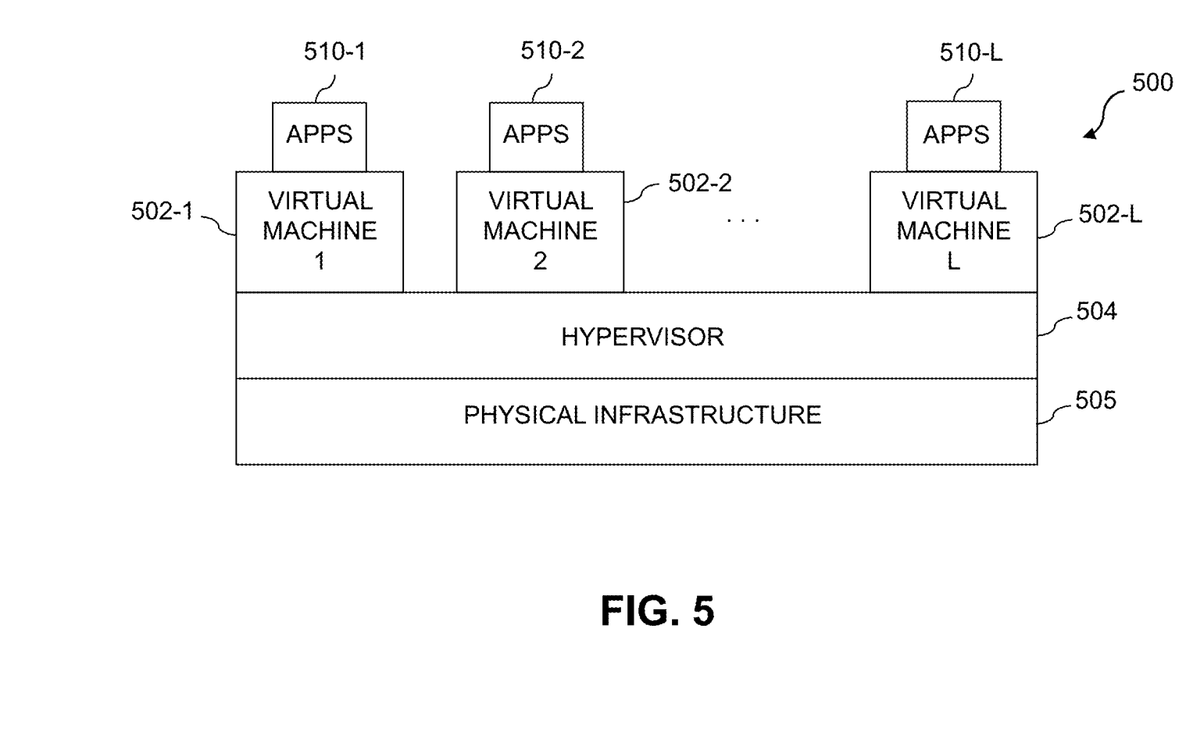
FIGS. 5 and 6 show examples of processing platforms that may be utilized to implement at least a portion of an information processing system in illustrative embodiments.
Figure 6:
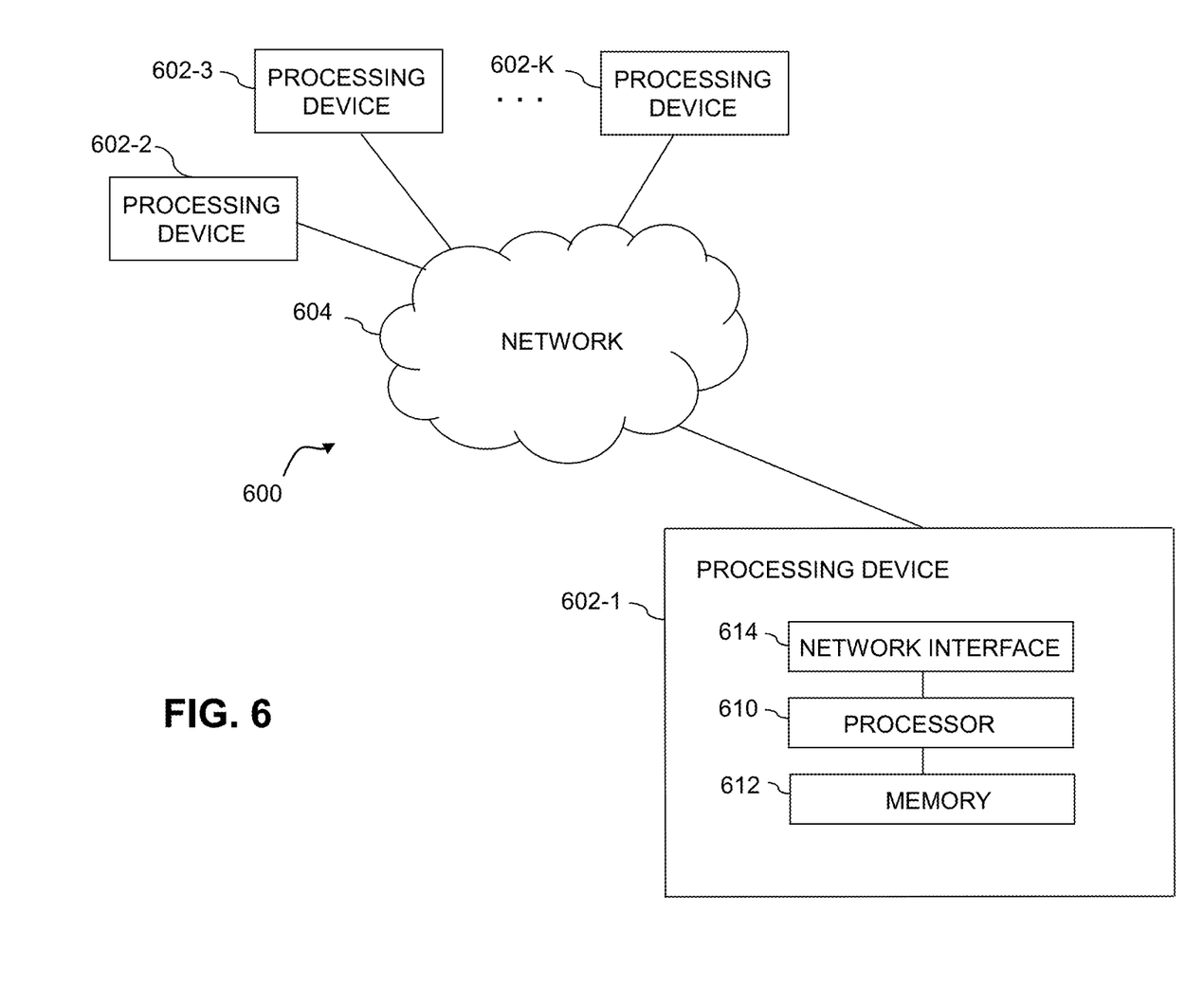

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises virtual machines (VMs) 502-1, 502-2, . . . 502-L implemented using a hypervisor 504. The hypervisor 504 runs on physical infrastructure 505. The cloud infrastructure 500 further comprises sets of applications 510-1, 510-2, . . . 510-L running on respective ones of the virtual machines 502-1, 502-2, . . . 502-L under the control of the hypervisor 504.

Although only a single hypervisor 504 is shown in the embodiment of FIG. 5, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 504 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the productivity platform 105 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and productivity platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising a plurality of processing devices;
said at least one processing platform being configured:
to receive a request to deploy one or more applications of a plurality of selected applications, wherein the plurality of selected applications are selected based on a determined role of an individual within an enterprise;
to deploy the one or more applications for at least one user device responsive to the request, wherein deploying the one or more applications comprises automatically configuring the one or more applications on the at least one user device in accordance with one or more mobile device management policies selected based at least in part on an operating system of the at least one user device and an ownership type of the at least one user device, wherein automatically configuring the one or more applications comprises enabling self-activation of the at least one user device to connect the one or more applications to one or more backend resources of the enterprise;
to monitor execution of the one or more applications on the at least one user device;
to receive and analyze data corresponding to the execution of the one or more applications on the at least one user device, wherein the received and analyzed data comprises automated usage data for each of the one or more applications of the plurality of selected applications on the at least one user device;
wherein in analyzing the automated usage data, said at least one processing platform is configured to identify whether a time of use of any of the one or more applications of the plurality of selected applications is below a threshold;
to modify the plurality of selected applications based on the determined role of the individual within the enterprise to at least one of remove and replace a given one of the plurality of selected applications having a time of use below the threshold; and
to automatically generate one or more recommendations in connection with the deployment of the one or more applications for the at least one user device based on the received and analyzed data, and based on the modified plurality of selected applications available for the determined role of the individual within the enterprise;
wherein the one or more recommendations comprise an identification of relative levels of usage for each of the plurality of selected applications on the at least one user device, and a recommendation to at least one of modify, replace and remove the one or more applications;
wherein the one or more recommendations are at least in part generated by application of one or more machine learning algorithms:
wherein, in connection with generating the one or more recommendations, the one or more machine learning algorithms analyze: (i) the automated usage data for each of the one or more applications of the plurality of selected applications; and (ii) feedback from a user of the at least one user device, the feedback comprising data regarding whether the one or more applications of the plurality of selected applications are being used, are deemed useful by the user and are deemed difficult to use by the user;
wherein deploying the one or more applications for the at least one user device comprises presenting, via a graphical user interface of the at least one user device, technology bundle information comprising:
graphical indicators showing the relative levels of usage of each of the plurality of selected applications on the at least one user device; and
one or more clickable icons which, when activated, initiate one or more actions for replacing at least a given one of the plurality of selected applications with one or more alternative applications; and
wherein at least a given one of the one or more clickable icons, when activated, generates a notification (i) indicating at least one of an end-of-life of the given one of the plurality of selected applications and a date at which the given one of the plurality of selected applications is planned to go out of service and (ii) provides instructions for replacing the given one of the plurality of selected applications with a given one of the one or more alternative applications.

2. The apparatus of claim 1 wherein said at least one processing platform is further configured:
  to receive the determined role of the individual within the enterprise as an input; and
  to match the plurality of selected applications with the received input.

3. The apparatus of claim 1 wherein the selection of the plurality of selected applications is further based on at least one of dynamic and real-time data.

4. The apparatus of claim 1 wherein the selection of the plurality of selected applications is further based on at least one of a change in application offerings of the enterprise, a change to one or more defined roles in the enterprise and a change to the determined role of the individual within the enterprise.

5. The apparatus of claim 1 wherein said at least one processing platform is further configured to automatically perform license harvesting based on the automated usage data.

6. The apparatus of claim 1 wherein the one or more applications provide one or more virtualization services.

7. The apparatus of claim 1 wherein the one or more applications provide one or more conferencing services.

8. The apparatus of claim 1 wherein the one or more applications provide one or more workspace collaboration services.

9. The apparatus of claim 1 wherein:
  the selection of the plurality of selected applications is further based on a change to one or more defined roles in the enterprise, a change to the determined role of the individual within the enterprise and a change in options for the enterprise to choose from for the plurality of selected applications; and
  said at least one processing platform is further configured:
  to mine data of the enterprise for an indication of the change to one or more of the defined roles in the enterprise, the change to the determined role of the individual within the enterprise and the change in the options for the enterprise to choose from for the plurality of selected applications; and
  to update the selection of the plurality of selected applications based on the indications.

10. The apparatus of claim 1 wherein the given clickable icon, when activated, generates the notification indicating the end-of-life of the given one of the plurality of selected applications.

11. The apparatus of claim 1 wherein the given clickable icon, when activated, generates the notification indicating the date at which the given one of the plurality of selected applications is planned to go out of service for the enterprise.

12. A method comprising:
  receiving a request to deploy one or more applications of a plurality of selected applications, wherein the plurality of selected applications are selected based on a determined role of an individual within an enterprise;
  deploying the one or more applications for at least one user device responsive to the request, wherein deploying the one or more applications comprises automatically configuring the one or more applications on the at least one user device in accordance with one or more mobile device management policies selected based at least in part on an operating system of the at least one user device and an ownership type of the at least one user device, wherein automatically configuring the one or more applications comprises enabling self-activation of the at least one user device to connect the one or more applications to one or more backend resources of the enterprise;
  monitoring execution of the one or more applications on the at least one user device;
  receiving and analyzing data corresponding to the execution of the one or more applications on the at least one user device, wherein the received and analyzed data comprises automated usage data for each of the one or more applications of the plurality of selected applications on the at least one user device;
  wherein analyzing the automated usage data comprises identifying whether a time of use of any of the one or more applications of the plurality of selected applications is below a threshold;
  modifying the plurality of selected applications based on the determined role of the individual within the enterprise to at least one of remove and replace a given one of the plurality of selected applications having a time of use below the threshold; and
  automatically generating one or more recommendations in connection with the deployment of the one or more applications for the at least one user device based on the received and analyzed data, and based on the modified plurality of selected applications available for the determined role of the individual within the enterprise;
  wherein the one or more recommendations comprise an identification of relative levels of usage for each of the plurality of selected applications on the at least one user device, and a recommendation to at least one of modify, replace and remove the one or more applications;
  wherein the one or more recommendations are at least in part generated by application of one or more machine learning algorithms:
  wherein, in connection with generating the one or more recommendations, the one or more machine learning algorithms analyze: (i) the automated usage data for each of the one or more applications of the plurality of selected applications; and (ii) feedback from a user of the at least one user device, the feedback comprising data regarding whether the one or more applications of the plurality of selected applications are being used, are deemed useful by the user and are deemed difficult to use by the user;
  wherein deploying the one or more applications for the at least one user device comprises presenting, via a graphical user interface of the at least one user device, technology bundle information comprising:
    graphical indicators showing the relative levels of usage of each of the plurality of selected applications on the at least one user device; and
    one or more clickable icons which, when activated, initiate one or more actions for replacing at least a given one of the plurality of selected applications with one or more alternative applications;
  wherein at least a given one of the one or more clickable icons, when activated, generates a notification (i) indicating at least one of an end-of-life of the given one of the plurality of selected applications and a date at which the given one of the plurality of selected applications is planned to go out of service and (ii) provides instructions for replacing the given one of the plurality of selected applications with a given one of the one or more alternative applications; and wherein the method is performed by at one processing platform comprising at least one processing device comprising a processor coupled to a memory.

13. The method of claim 12 further comprising:
receiving the determined role of the individual within the enterprise as an input; and
matching the plurality of selected applications with the received input.

14. The method of claim 12 wherein the selection of the plurality of selected applications is further based on at least one of dynamic and real-time data.

15. The method of claim 12 further comprising automatically performing license harvesting based on the automated usage data.

16. The method of claim 12 wherein:
the selection of the plurality of selected applications is further based on a change to one or more defined roles in the enterprise, a change to the determined role of the individual within the enterprise and a change in options for the enterprise to choose from for the plurality of selected applications; and
the method further comprises:
mining data of the enterprise for an indication of the change to one or more of the defined roles in the enterprise, the change to the determined role of the individual within the enterprise and the change in the options for the enterprise to choose from for the plurality of selected applications; and
updating the selection of the plurality of selected applications based on the indications.

17. A computer program product comprising a non-transitory processor-readable storage medium having stored therein program code of one or more software programs, wherein the program code when executed by at least one processing platform causes said at least one processing platform:
to receive a request to deploy one or more applications of a plurality of selected applications, wherein the plurality of selected applications are selected based on a determined role of an individual within an enterprise;
to deploy the one or more applications for at least one user device responsive to the request, wherein deploying the one or more applications comprises automatically configuring the one or more applications on the at least one user device in accordance with one or more mobile device management policies selected based at least in part on an operating system of the at least one user device and an ownership type of the at least one user device, wherein automatically configuring the one or more applications comprises enabling self-activation of the at least one user device to connect the one or more applications to one or more backend resources of the enterprise;
to monitor execution of the one or more applications on the at least one user device;
to receive and analyze data corresponding to the execution of the one or more applications on the at least one user device, wherein the received and analyzed data comprises automated usage data for each of the one or more applications of the plurality of selected applications on the at least one user device;
wherein in analyzing the automated usage data, the program code further causes said at least one processing platform to identify whether a time of use of any of the one or more applications of the plurality of selected applications is below a threshold;
to modify the plurality of selected applications based on the determined role of the individual within the enterprise to at least one of remove and replace a given one of the plurality of selected applications having a time of use below the threshold; and
to automatically generate one or more recommendations in connection with the deployment of the one or more applications for the at least one user device based on the received and analyzed data, and based on the modified plurality of selected applications available for the determined role of the individual within the enterprise;
wherein the one or more recommendations comprise an identification of relative levels of usage for each of the plurality of selected applications on the at least one user device, and a recommendation to at least one of modify, replace and remove the one or more applications;
wherein the one or more recommendations are at least in part generated by application of one or more machine learning algorithms:
wherein, in connection with generating the one or more recommendations, the one or more machine learning algorithms analyze: (i) the automated usage data for each of the one or more applications of the plurality of selected applications; and (ii) feedback from a user of the at least one user device, the feedback comprising data regarding whether the one or more applications of the plurality of selected applications are being used, are deemed useful by the user and are deemed difficult to use by the user;
wherein deploying the one or more applications for the at least one user device comprises presenting, via a graphical user interface of the at least one user device, technology bundle information comprising:
graphical indicators showing the relative levels of usage of each of the plurality of selected applications on the at least one user device; and
one or more clickable icons which, when activated, initiate one or more actions for replacing at least a given one of the plurality of selected applications with one or more alternative applications; and
wherein at least a given one of the one or more clickable icons, when activated, generates a notification (i) indicating at least one of an end-of-life of the given one of the plurality of selected applications and a date at which the given one of the plurality of selected applications is planned to go out of service and (ii) provides instructions for replacing the given one of the plurality of selected applications with a given one of the one or more alternative applications.

18. The computer program product of claim 17 wherein the program code when executed by said at least one processing platform further causes said at least one processing platform:
to receive the determined role of the individual within the enterprise as an input; and
to match the plurality of selected applications with the received input.

19. The computer program product of claim 17 wherein the selection of the plurality of selected applications is further based on at least one of dynamic and real-time data.

20. The computer program product of claim 17 wherein:
the selection of the plurality of selected applications is further based on a change to one or more defined roles in the enterprise, a change to the determined role of the individual within the enterprise and a change in options for the enterprise to choose from for the plurality of selected applications; and the program code when executed by said at least one processing platform further causes said at least one processing platform:

to mine data of the enterprise for an indication of the change to one or more of the defined roles in the enterprise, the change to the determined role of the individual within the enterprise and the change in the options for the enterprise to choose from for the plurality of selected applications; and to update the selection of the plurality of selected applications based on the indications.

\* \* \* \* \*